UNITED STATES PATENT OFFICE 2,179,990

DYES AND PROCESS FOR THE PREPARATION THEREOF

Bernard Beilenson, Harrow, England, assignor to Eastman Kodak Company, Rochester, N. Y., a corporation of New Jersey No Drawing. Application February 2, 1939, Serial No. 254,256. In Great Britain February 5, 1938

13 Claims. (Cl. 260—240)

This invention relates to dyes and to a process for the preparation thereof. More particularly, this invention relates to dyes containing a benzothiazine nucleus and to a process for preparing the same.

In my copending application Serial No. 138,158, filed April 21, 1937 (of which the instant application is a continuation-in-part), I have shown how to obtain simple cyanine dyes containing a benzothiazine nucleus. I have now found a new method for preparing such dyes and for preparing carbocyanine dyes containing a benzothiazine nucleus. Whereas, in my prior application I described the preparation of dyes by condensing a 3-alkylthiol-benzothiazine quaternary salt with a cyclammonium quaternary salt containing a methyl group in a reactive position, I have now found that 3-methyl-2,4-benzothiazines can be condensed with cyclammonium quaternary salts containing reactive groups, such as halogen atoms (especially iodine), alkylthiol or β-arylaminovinyl groups for example, in the alpha or gamma position, i. e. one of the so-called reactive positions. The dyes obtained by such a condensation are not cyanine dyes, but rather are cyanine dye bases which can be converted into cyanine dyes by condensation with appropriate organic salts or esters, such as ethyl-p-toluenesulfonate or ethyl iodide for example.

In my instant process, the initial formation of quaternary salts of 3-methyl-2,4-benzothiazines is avoided. This is especially advantageous in the preparation of the carbocyanine dyes, since any attempt to form quaternary salts of 3-methyl-2,4-benzothiazine in situ by fusing a 3-methyl-2,4-benzothiazine with the appropriate organic salt in the presence of a β-arylaminovinyl compound results in the formation of so many side-reaction products that isolation of any of the small amount of carbocyanine dye containing a 2,4-benzothiazine nucleus, which may possibly be formed, becomes impractical.

The dye bases which I obtain in my new process are useful for purposes other than the preparation of cyanine dyes. Thus, my new dye bases can be employed to sensitize spectrally photographic silver halide emulsions. My new dyes can also be employed in the manufacture of light filters.

I am aware that quinoline bases, such as quinaldine, have been condensed with cyclammonium quaternary salts containing a reactive group in the alpha or gamma position to give dye bases containing a basic quinoline nucleus. However, not all heterocyclic nitrogen bases containing methyl groups can be so condensed. Thus, it is very difficult or impossible to prepare dye bases from 1-methylbenzothiazole, 2-methyl-β-naphthothiazole, 2-methyl-4-phenylthiazole and 1-methylbenzoxazole for example, and even when it is possible the yields are very poor. Accordingly, the condensation of 3-methyl-2,4-benzothiazines with cyclammonium quaternary salts containing a reactive group is usual and unlike the majority of heterocyclic nitrogen bases containing a methyl group in the alpha or gamma position. As photographic sensitizers, my new dye bases differ from the aforesaid bases containing a quinoline nucleus in that my new dye bases desensitize photographic emulsions to a lesser degree than do the quinoline bases.

It is, therefore, an object of my invention to provide new dyes bases and a process for the preparation thereof. A further object is to provide carbocyanine dyes containing a benzothiazine nucleus and a process for the preparation thereof. Other objects will appear hereinafter.

My new dye bases can be represented by the following general formulas:

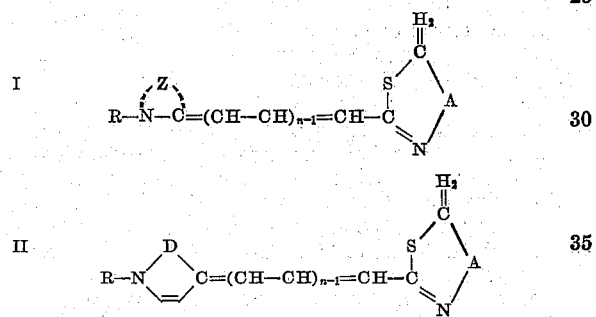

wherein A represents a phenylene group, D represents a phenylene group, $n$ represents a positive integer not greater than two, R represents an alkyl group and Z represents the non-metallic atoms necessary to complete a five-membered or six-membered heterocyclic nucleus. More specifically, in the above formulas, R can represent an alkyl group, such as methyl, ethyl, n-butyl, allyl, β-ethoxyethyl or benzyl for example, and Z can represent the non-metallic atoms necessary to complete a five-membered heterocyclic nucleus, such as a thiazole, a 4-methylthiazole, a 4-phenylthiazole, a benzothiazole, a 4-chlorobenzothiazole, an α-naphthothiazole, and β-naphthothiazole, a thiazoline, a benzoxazole, an α-naphthoxazole, a β-naphthoxazole or a benzoselenazole for example or Z can represent the non-metallic atom or Z can represent the non-metallic atoms necessary to complete a six-membered heterocyclic nucleus, such as a quinoline nucleus for example.

In preparing my new dye bases according to my invention, I condense a 3-methyl-2,4-benzothiazine with a cyclammonium quaternary salt containing a reactive group, such as an iodine atom, an alkylthiol, an arylthiol group or a β-arylaminovinyl group for example, in the alpha or gamma position. Heat accelerates the formation of the dye bases. The condensations are advantageously effected in the presence of a basic condensing agent.

While the process of preparing the dye bases is subject to variation, particularly as respects the nature and quantity of the 3-methyl-2,4-benzothiazine employed, the nature and quantity of the cyclammonium quaternary salt employed, the nature and quantity of the base employed, if any, and the manner of isolating and purifying the dye bases, the following examples will serve to illustrate the manner of obtaining the dye bases. These examples are not intended to limit my invention.

*Example 1.—Methyl - 3 - (N - methyldihydro-2,4-benzothiazine) -3'(2',4-benzothiazine)*

1.95 g. (1 mol.) of 3-methylthiol-2,4-benzothiazine was fused with 1.86 g. (1 mol.) of methyl-p-toluenesulfonate for about three hours by heating at 150° to 160° C. in an oil bath. The reaction mixture was cooled to about 140° C. and 1.63 g. (1 mol.) of 3-methyl-2,4-benzothiazine were added thereto. The resulting mixture was then heated at 140° C. for a short time, after which it was cooled to 100° C. At this time, 30 cc. of an aqueous caustic soda solution (10%) were added. The resulting mixture was stirred for about 10 minutes at 100° C. The reaction mixture was then cooled and extracted with benzene. The benzene extract was dried over anhydrous potassium carbonate and then the benzene was distilled away. The dark oil remaining, when cool, was stirred with ethyl acetate until it solidified. The solid product was recrystallized from hot ethyl acetate and a yellow dye, melting at 162° C., was obtained. This dye, in a concentration of 10 mg. per liter of emulsion, sensitized a gelatino-silver-chloride emulsion out to about 490 mu, with a maximum at about 440 mu.

In the above example, caustic soda was added to the reaction mixture to free the dye base from its salt with p-toluenesulfonic acid which forms during the condensation.

In a manner similar to that illustrated in the foregoing example, 1-alkylthiolbenzothiazole, 1-alkylthiolbenzoxazole, 1-alkylthiol-α-naphthothiazole (1-alkylthiol-5,6-benzobenzothiazole), 2-alkylthiol-β-naphthothiazole (2-alkylthiol-3,4-benzobenzothiazole), 1-alkylthiolbenzoselenazole, 2-alkylthiolquinoline or 4-alkylthiolquinoline quaternary salts (or the corresponding arylthiol, particularly phenylthiol, quaternary salts) can be condensed with 3-methyl-2,4-benzothiazines.

*Example 2.—Trimethenyl-1-(N-ethyldihydrobenzothiazole)-3'-(2',4'-benzothiazine)*

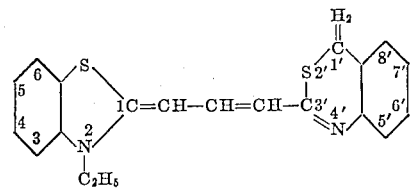

1.63 g. (1 mol.) of 3-methyl-2,4-benzothiazine and 4.5 g. (1 mol.) of 1-(β-acetanilidovinyl)-benzothiazole ethiodide (also called 1-(ω-acetanilidovinyl)-benzothiazole ethiodide) were placed in about 10 cc. of dry pyridine. The mixture was boiled under reflux for about 5 minutes. The resulting reaction mixture was poured into ethyl alcohol containing ammonia. The solid which formed was extracted with benzene from which solvent it crystallized in the form of dark brown rhombs. The dye gave a yellow solution in ethyl alcohol and melted at from 199° to 200° C. This dye, in a concentration of about 10 mg. per liter of emulsion, sensitized a gelatino-silver-bromide emulsion out to about 650 mu, with a maximum at about 540 mu.

*Example 3.—Trimethenyl-1-(N-ethyldihydrobenzoxazole)-3'-(2',4'-benzothiazine)*

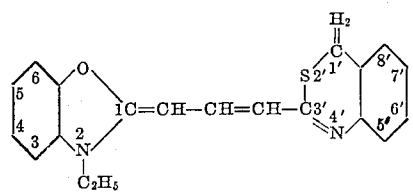

1.63 g. (1 mol.) of 3-methyl-2,4-benzothiazine and 4.34 g. (1 mol.) of 1-(β-acetanilidovinyl) benzoxazole ethiodide were placed in about 10 cc. of dry pyridine. The mixture was boiled under reflux for about 5 minutes. The resulting reaction mixture was poured into ethyl alcohol containing ammonia. The dark oil which separated was stirred with acetone until it crystallized. The orange crystals were recrystallized from ethyl acetate and obtained as light brown rhombs having a blue reflex. The dye gave a yellow solution in ethyl alcohol and melted at from 137 to 138° C. This dye, in a concentration of about 10 mg. per liter of emulsion, sensitized a gelatino-silver-halide emulsion out to about 600 mu, with a maximum at about 530 mu.

*Example 4. — Trimethenyl-1-(N-ethyldihydro-5,6-benzobenzoxazole)-3'-(2',4'-benzothiazine)*

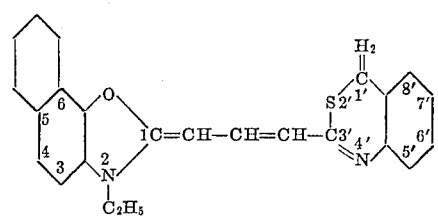

1.63 g. (1 mol.) of 3-methyl-2,4-benzothiazine and 4.84 g. (1 mol.) of 1-(β-acetanilidovinyl)-5,6-benzobenzoxazole ethiodide were placed in about 10 cc. of dry pyridine. The mixture was boiled under reflux for about 5 minutes. The resulting reaction mixture was poured into ethyl alcohol containing ammonia. The dark oil which separated was stirred with acetone until crystals formed. The crystals were recrystallized from ethyl acetate and obtained as brown crystals having a blue reflex. The dye gave a strong yellow color in ethyl alcoholic solution and melted at from 162 to 163° C. This dye, in a concentration of about 10 mg. per liter of emulsion, sensitized a gelatino-silver-bromide emulsion out to about 640 mu with a maximum at about 540 mu.

Example 5. — Trimethenyl-1-(N-ethyldihydro-3,4-benzobenzothiazole)-3'-2',4'-benzothiazine)

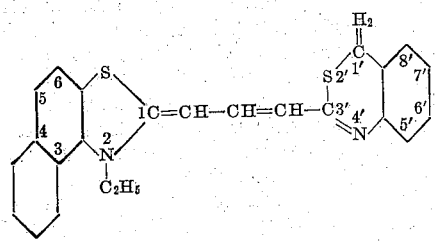

1.63 g. (1 mol.) of 3-methyl-2,4-benzothiazine and 5 g. (1 mol.) of 1-(β-acetanilidovinyl)-3,4-benzobenzothiazole ethiodide were placed in about 10 cc. of dry pyridine. The mixture was boiled under reflux for about 5 minutes. The resulting reaction mixture was poured into ethyl alcohol containing ammonia. The paste which separated was stirred with cold acetone until it solidified. The brown crystals were recrystallized from benzene and the dye was obtained in the form of maroon crystals having a blue reflex and melting at 196° C. The dye, in a concentration of 5 mg. per liter of emulsion, sensitized a gelatino-silver-bromide emulsion out to about 630 mu, with a maximum at about 580 mu.

Example 6. — Trimethenyl-1-(N-ethyldihydrobenzoselenazole)-3'-(2'-4'-benzothiazine)

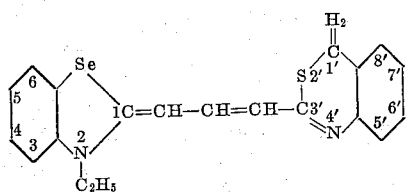

1.63 g. (1 mol.) of 3-methyl-2,4-benzothiazine and 4.97 g. (1 mol.) of 1-(β-acetanilidovinyl-benzoselenazole ethiodide were placed in about 10 cc. of dry pyridine. The mixture was boiled under reflux for about 5 minutes. The resulting reaction mixture was poured into ethyl alcohol containing ammonia. The powdery precipitate which formed was extracted with hot benzene. Small brown crystals of the dye separated from the benzene extract upon cooling. The dye gave an intensely yellow solution in methyl alcohol, the color changing to purple in the presence of a trace of acid. The dye melted at 212° C. The dye, in a concentration of 20 mg. per liter of emulsion, sensitized a gelatino-silver-bromide emulsion out to about 640 mu, with a very flat maximum at about 530 mu and a weak secondary maximum at about 570 mu.

Example 7

0.7 g. (1 mol.) of the dye-base of Example 2 and 0.8 g. (2 mols.) of ethyl p-toluenesulphonate were fused together in an oil-bath at 150° for 3 hours, the mass being then cooled and dissolved in spirit. A strong aqueous solution of potassium iodide was added and the dye filtered off, washed with water, dried and recrystallised from methyl alcohol. Dark blue-grey needles were obtained, melting with decomposition at 231–232° C.

Example 8

1.63 g. (1 mol.) of the dye base of Example 3 and 4 g. (2 mols.) of ethyl p-toluenesulphonate were fused together in an oil-bath at 150° for 3 hours, the mass being then cooled and dissolved in spirit. A strong aqueous solution of potassium iodide was added and the dye filtered off, washed with water, dried and recrystallised from methyl alcohol. It decomposed at 237° C.

I have found it advantageous to employ the alkiodides of cyclammonium quaternary salts containing a β-arylaminovinyl group in a reactive position. I have found that acylated β-arylaminovinyl derivatives, such as β-acetanilidovinyl, β-propionanilidovinyl or β-benzanilidovinyl derivatives, are advantageously employed.

As basic condensing agents, pyridine, advantageously in the anhydrous form, is especially efficacious. Other organic bases can be used, for example piperidine, N-methylpiperidine, triethylamine or other strong organic bases, i. e. organic bases having a dissociation constant substantially greater than that of pyridine. Strong organic bases can be employed in conjunction with pyridine or with an alcohol, e. g. a lower aliphatic alcohol such as methyl, ethyl, propyl or butyl alcohols. Sodium carbonate can be employed, advantageously in conjunction with a lower aliphatic alcohol. When the condensations are effected in the presence of pyridine, it is advisable to treat the reaction mixture with aqueous ammonia to precipitate the dye base in its free form, as illustrated in the foregoing examples.

In a manner similar to that illustrated in the above examples, 3-methyl-2,4-benzothiazines can be condensed with 2-(β-acetanilidovinyl)-thiazoline, 2-(β-acetanilidovinyl)-quinoline, 2-(β-acetanilidovinyl)-4-phenylthiazole or 4-(β-acetanilidovinyl)-quinoline quaternary salts.

My new dye bases can be converted into cyanine dyes by heating the bases with alkyl-p-toluenesulfonates or alkyl sulfates for several hours at about 150° C. The resulting cyanine toluenesulfonates or alkylsulfates can then be converted into the corresponding cyanine iodides or perchlorates for example by treatment with soluble iodides or perchlorates, e. g. sodium iodide or perchlorate. The new carbocyanine dyes obtainable from my new dye bases can be represented by the following general formulas:

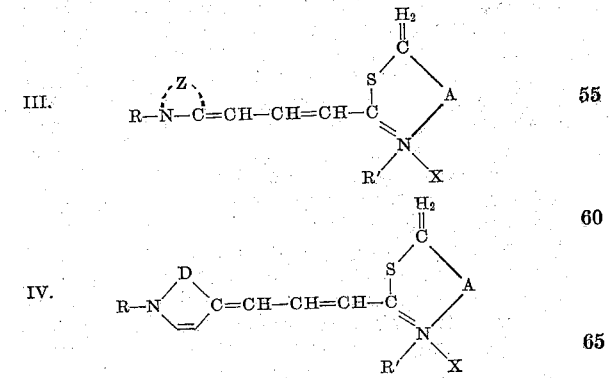

wherein A represents a phenylene group, D represents a phenylene group, R and R' represent alkyl groups, X represents an acid radical and Z represents the non-metallic atoms necessary to complete a five-membered or six-membered heterocyclic nucleus. These dyes are useful for spectrally sensitizing photographic silver halide emulsions.

I have also found that 3-amino-2,4-benzothiazines or their quaternary salts can be condensed with cyclammonium quaternary salts containing a reactive group, such as a halogen atom, especially iodine, an alkylthiol group, an arylthiol group or a β-arylaminovinyl group for example, in the alpha or gamma position. When 3-amino-2,4-benzothiazine quaternary salts are employed, azacyanine dyes containing a benzothiazine nucleus are obtained. When 3-amino-2,4-benzothiazines themselves are employed, the corresponding azacyanine dye bases are obtained. The following examples serve to illustrate the formation of these azocyanine dyes and their bases.

*Example 9. — 2,4' - diethyl - 2',4' - thiathiazino - γ-azacarbocyanine iodide*

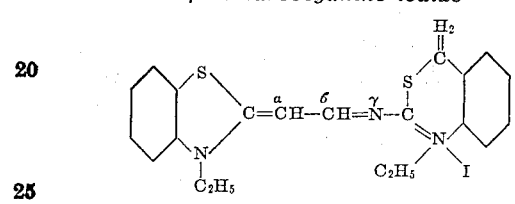

1.5 g. (1 mol.) of 3-amino-2,4-benzothiazine ethiodide, 2 g. (1 mol.) of 1-(β-acetanilidovinyl)-benzothiazole ethiodide and 0.63 g. (1 mol.) of anhydrous potassium carbonate (180 mesh) were placed in about 10 cc. of absolute ethyl alcohol. The mixture was stirred and heated at about 100° C. for about 7 minutes. The dye which separated was filtered off, washed with water, dried and recrystallized from methyl alcohol. It was obtained as a dark olive-green powder, melting at 240° C. The dye sensitized a gelatino-silver-chloride emulsion weakly out to about 500 mu, with a maximum at about 470 mu.

*Example 10.—3-azamethenyl-[2-(N-ethyldihydrobenzothiazole)]-3'-(2',4'-benzothiazine)*

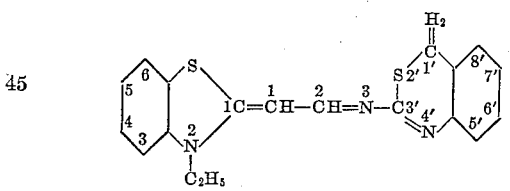

1.64 g. (1 mol.) of 3-amino-2,4-benzothiazine and 4.5 g. (1 mol.) of 1-(β-acetanilidovinyl)-benzothiazole ethiodide were placed in 10 cc. of dry pyridine. The resulting mixture was boiled under reflux for several minutes. The reaction mixture was then poured into an ethyl alcoholic solution of ammonia. The solid which precipitated was taken up in hot benzene. Upon cooling the benzene extract, a tar first separated and then light brown crystals of the dye base. These crystals melted at 145° C. The dye base had no photographic sensitizing action.

I have also found that 3-amino-2,4-benzothiazines or their quaternary salts can be condensed with esters of orthoformic acid to give azacarbocyanine dye bases or azacarbocyanine dyes containing two benzothiazine nuceli. The condensations are advantageously affected in pyridine.

3-methyl-2,4-benzothiazines can be prepared according to the method of Gabriel and Posner—Berichte der deutschen chemischen Gesellschaft, vol. 27, page 3509, 1894, e. g. by the action of thioacetamide on o-aminobenzylchloride hydrochloride.

3-amino-2,4-benzothiazines can be prepared according to the method of Gabriel and Posner—Berichte der deutschen chemischen Gesellschaft, vol. 28, page 1030, 1895, e. g. by the action of thiourea on o-aminobenzylchloride hydrochloride. Quaternary salts of 3-amino-2,4-benzothiazines can be prepared by heating the benzothiazines with ethyl iodide for example.

Cyclammonium quaternary salts containing an alkylthiol or an arylthiol group in a reactive position can be prepared from the corresponding heterocyclic nitrogen bases containing an alkylthiol or arylthiol group by heating the bases with esters, such as ethyl iodide or ethyl-p-toluenesulfonate for example, for several hours at 100° to 150° C. as is well known in the art. The aforesaid heterocyclic nitrogen bases containing an alkylthiol group are advantageously prepared from the corresponding heterocyclic nitrogen bases containing a mercapto group by alkylation of the mercapto compounds with dialkyl sulfates or alkyl-p-toluenesulfonates, as is well known in the art. The aforesaid heterocyclic nitrogen bases containing an arylthiol group are advantageously prepared by condensing the corresponding heterocyclic nitrogen base containing a halogen atom with aromatic mercaptans, such as thiophenol or β-thionaphthol, for example, in the presence of a basic condensing agent, such as triethylamine for example.

Cyclammonium quaternary salts containing a β-arylaminovinyl group in a reactive position are, of course, well known compounds and can be prepared by condensing cyclammonium quaternary salts containing a methyl group in a reactive position with diarylformamidines.

What I claim as my invention and desire to be secured by Letters Patent of the United States is:

1. A dye base characterized by one of the following two formulas:

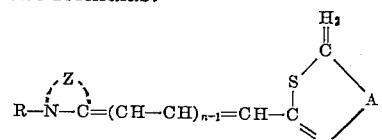

and

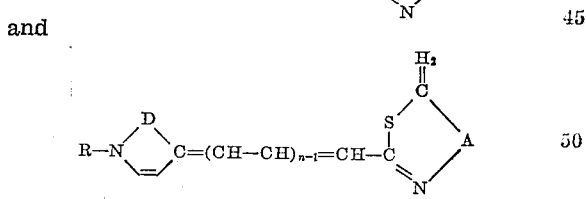

wherein A represents a phenylene group, D represents a phenylene group, R represents an alkyl group, n represents a positive integer not greater than two and Z represents the non-metallic atoms necessary to complete a heterocyclic nucleus selected from the group consisting of five-membered and six-membered heterocyclic nuclei.

2. A dye base characterized by the following formula:

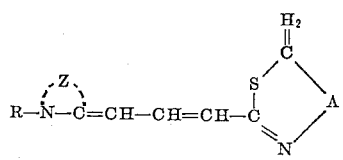

where A represents a phenylene group, R represents an alkyl group, and Z represents the non-metallic atoms necessary to complete a heterocyclic nucleus selected from the group consisting of five-membered and six-membered heterocyclic nuclei.

3. A dye base characterized by the following formula:

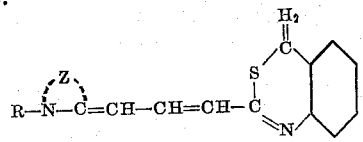

wherein R represents an alkyl group and Z represents the non-metallic atoms necessary to complete a heterocyclic nucleus selected from the group consisting of five-membered and six-membered heterocyclic nuclei.

4. A dye base characterized by the following formula:

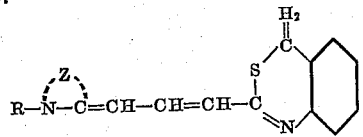

wherein R represents an alkyl group and Z represents the non-metallic atoms necessary to complete an azole nucleus.

5. A dye base characterized by the following formula:

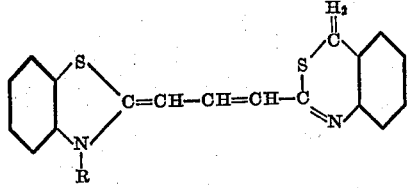

wherein R represents an alkyl group.

6. A dye base characterized by the following formula:

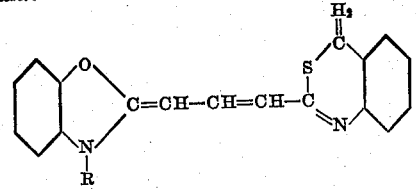

wherein R represents an alkyl group.

7. A dye base characterized by the following formula:

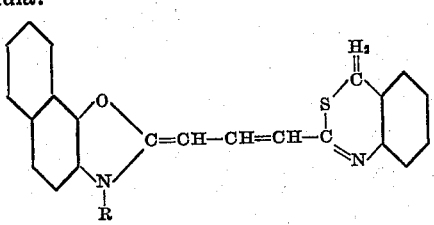

wherein R represents an alkyl group.

8. A dye base characterized by the following formula:

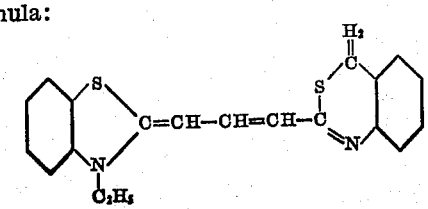

9. A dye base characterized by the following formula:

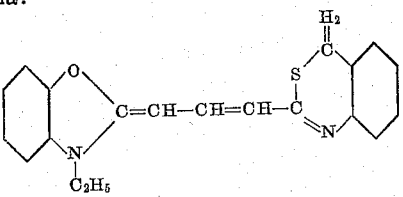

10. A dye base characterized by the following formula:

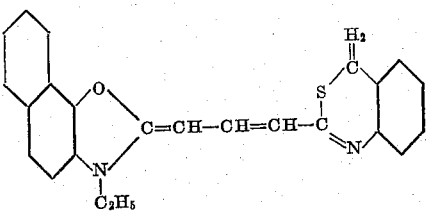

11. A carbocyanine dye characterized by one of the following formulas:

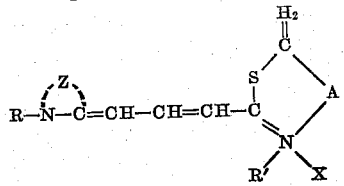

and

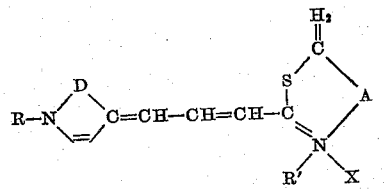

wherein A represents a phenylene group, D represents a phenylene group, R and R' represent alkyl groups, X represents an acid radical and Z represents the non-metallic atoms necessary to complete a five-membered or six-membered heterocyclic nucleus.

12. A process for preparing a dye base comprising condensing 3-methyl-2,4-benzothiazine with a cyclammonium quaternary salt, containing in a reactive position, a group selected from the group consisting of halogen atoms, alkylthiol groups, arylthiol groups and β-arylaminovinyl groups.

13. A process for preparing a dye comprising condensing 3-methyl-2,4-benzothiazine with a cyclammonium quaternary salt, containing in a reactive position, a group selected from the group consisting of halogen atoms, alkylthiol groups, arylthiol groups and β-arylaminovinyl groups, freeing the resulting dye base from any of its salt which forms during the condensation by treatment with a basic substance, and treating the resulting dye base with an organic ester to form a carbocyanine dye.

BERNARD BEILENSON.